Patented June 5, 1945

2,377,682

UNITED STATES PATENT OFFICE 2,377,682

PREPARATION OF NEW DERIVATIVES OF AROMATIC AMINES

Gastao Etzel, Newark, Del., assignor to E. I. du Pont de Nemours & Company, Wilmington, Del., a corporation of Delaware No Drawing. Application May 27, 1942, Serial No. 444,685

5 Claims. (Cl. 260—576)

This invention relates to processes for the preparation of new derivatives of aromatic amines. More particularly it relates to the condensation of primary aromatic amines with a terpene hydrocarbon in the presence of a surface active aluminum or magnesium hydrosilicate. The invention also relates to novel aromatic amine derivatives obtainable by the processes just described.

This invention has for an object the provision of a new derivative of aromatic amines. A further object is to prepare such derivative by a simple process. Still other objects will be apparent from the hereinafter described invention.

The above objects are accomplished by heating a primary aromatic amine with a terpene hydrocarbon in the presence of a surface active catalyst comprising an aluminum or magnesium hydrosilicate.

The terpene hydrocarbon and an excess of the primary aromatic amine are heated in admixture at normal or elevated pressure with a material amount by weight of a surface active aluminum or magnesium hydrosilicate or a mixture of such hydrosilicates. A temperature of at least 50° C. is maintained until an appreciable amount of the aromatic amine has reacted. In general, a period of at least 5 hours is necessary to obtain an economical recoverable yield.

It has been found that if temperatures from 50 to about 200° C. are used a substitution reaction takes place on the nitrogen atom to form mainly N-terpene substituted or secondary terpenyl aromatic amines. However, if the reaction temperature is raised above 200° C. and further heating applied, the N-terpene substitution products formed rearrange to give carbon substituted or primary terpenyl aromatic amines. At temperatures in excess of 250° C. this rearrangement takes place quite readily. However, even at the low reaction temperatures some nuclear substituted or primary terpenyl aromatic amines are formed. Some isomerization of the terpene nucleus may take place; for example, the final configuration from camphene may be of a bornyl structure.

After completion of the reaction the catalyst can be removed by filtration and the reaction product fractionally distilled to separate the condensation product from the unreacted amine.

The aromatic amine and terpene hydrocarbon, if liquids, can be admixed by simple stirring. If normally solid they can be liquefied separately or together by heating and the surface active catalyst added. However, inert organic solvents such as petroleum hydrocarbons, e. g., decalin and cyclohexane, can be used if desired. At least one mol of aromatic amine should be used per mol of terpene hydrocarbon. An excess of at least 50% aromatic amine over the terpene hydrocarbon is preferred.

In the preferred embodiment of the invention, a mol of a terpene such as pinene or camphene is reacted with a molar excess of an aromatic primary amine such as aniline at a temperature of from 100 to 300° C. for a period of 8 to 50 hours.

The invention will be further illustrated but is not intended to be limited by the following examples.

Example I

A mixture of 500 parts by weight of camphene and 513 parts of aniline was heated to 140° C. under atmospheric pressure and 100 parts of fuller's earth was added, in portions, during a period of 90 minutes. The mixture was heated at 140° C. for 10 hours, cooled and filtered. The product was fractionally distilled under reduced pressure. The fraction boiling at 165° C. at 5 mm. pressure consisted of a mixture of primary and secondary terpenyl anilines.

Example II

A mixture of 1500 parts by weight of camphene, 1438 parts of aniline and 225 parts of fuller's earth was heated in an autoclave at 200° C. for 10 hours. The reaction product was cooled, filtered and fractionally distilled. The fraction boiling at 161–163° C. at 5 mm. consisted of a mixture of terpenyl anilines of which 13.8% was primary amine.

Example III

A mixture of 150 parts by weight of camphene, 115 parts of aniline and 25 parts of fuller's earth was heated in an autoclave at 250° C. for 40 hours. The crude mixture was cooled, filtered and fractionally distilled. The portion boiling at 219–226° C. under 40 mm. pressure consisted of a mixture of primary and secondary mono-terpenyl anilines of which 80% was primary amine.

Example IV

A mixture of 408 parts by weight of camphene, 372 parts of aniline and 60 parts of stargil, a porous aluminum hydrosilicate having the approximate composition $SiO_2$ 48.9%; moisture 12.6%; $Fe_2O_3$ 1.2%; $Al_2O_3$ 36.4%, and total alkali as oxide, 0.5%, was heated in an autoclave at 250° C. for 12 hours. The product was recovered as in the preceding examples and consisted of a mixture of primary and secondary monoterpenyl anilines.

Example V

A mixture of 150 parts by weight of camphene, 145 parts of orthotoluidine and 30 parts of fuller's earth was heated in an autoclave at 250° C. for 40 hours. The mixture of monoterpenyl amines was recovered as in the preceding example and had a boiling range of 200-240° C. at 40-50 mm. pressure. A fraction of primary monoterpenyl amine was recovered at 235-240° C. at 50 mm pressure.

Example VI

A mixture of 100 parts by weight of pinene, 100 parts of aniline and 22 parts of fuller's earth was heated in an autoclave at 200° for 10 hours. The crude product was cooled, filtered and fractionated under reduced pressure. The portion boiling at 178-185° C. under 10-12 mm. pressure consisted of monoterpenyl anilines of which about 65% was primary amine.

Example VII

A mixture of 10 parts by weight of dipentene, 10 parts of aniline and 2 parts of fuller's earth was heated in an autoclave at 200° C. for 10 hours. The product was recovered as in the preceding examples and had a boiling range of 160-165° C. at 5 mm. and 70% of the monoterpenyl anilines was primary amine.

Example VIII

A mixture of 750 parts by weight of mixed terpene hydrocarbons obtainable as by-products in the isomerization of pinene to camphene as described in United States Patent 2,129,323, 564 parts of aniline and 150 parts of fuller's earth was heated in an autoclave at 200° C. for 10 hours. The product, recovered as in the preceding examples, consisted of monoterpenyl anilines boiling at 190-197° C. under 5-10 mm. pressure.

The invention is not limited to the condensation of the specific terpene hydrocarbons mentioned in the above examples. On the contrary, any unsaturated terpene hydrocarbons can be used in like manner. Cyclic terpenes, however, constitute preferred reactants. Among the useful additional terpenes which can be substituted for the terpenes in the above examples are menthene, limonene, terpinolene, terpinene, alloocimene, dihydromyrcene and alpha thujene. Mixtures of two or more of the herein disclosed terpenes and especially the mixtures of terpene hydrocarbons formed as by-products in the isomerization of pinene to camphene can be reacted with one or more aromatic amines.

In place of aniline as the aromatic amine described in the above examples can be substituted other aromatic primary amines, including mono-, di and polyamines. Suitable other amines include toluidines, α- and β-naphthylamine, xylidenes, α- and β-amino-anthraquinone and diphenylamines.

Various other active aluminum and magnesium hydrosilicates can be used in place of the fuller's earth of the above examples. Florida earth and other bleaching earths which are activated by treatment with acids such as infusorial earth, tonsil, bentonite, etc., can be substituted in like manner. In U. S. P. 1,936,567 are described such earths and others sold under various trade names which can be utilized in accordance with the teachings hereof.

The catalysts just described can be used over a fairly wide range of amounts. In general, at least 3% by weight of the amine and terpene is required and up to 30% may be used. A preferred range is from 5% to 20%.

The products of this invention have many and diverse uses. They can be used to form surface active agents. They also form valuable dyestuff intermediates.

This invention has a number of advantages, the primary one being that derivatives of aromatic amines can be prepared from terpene hydrocarbons in a simple and economical manner.

As many apparently widely different embodiments of this invention may be made without departing from the spirit and scope thereof, it is to be understood that this invention is not to be limited to the specific embodiments hereof, except as defined in the appended claims.

I claim:

1. The process which comprises reacting in admixture an aromatic primary amine and a terpene hydrocarbon in the presence of a surface active hydrosilicate taken from the class consisting of aluminum and magnesium hydrosilicates.

2. The process which comprises heating in admixture an aromatic primary amine and a terpene hydrocarbon to a temperature from 50° to 300° C. for a period of at least 5 hours in the presence of a surface active hydrosilicate taken from the class consisting of aluminum and magnesium hydrosilicates.

3. The process which comprises heating in admixture a molar excess of an aromatic primary amine and a terpene hydrocarbon to a temperature from 50° C. to 300° C. for a period of 10 to 40 hours in the presence of from 5% to 20% by weight, based on the combined weight of said primary amine and terpene hydrocarbon, of a surface active hydrosilicate taken from the class consisting of aluminum and magnesium hydrosilicates.

4. A process as set forth in claim 3 wherein said hydrosilicate is fuller's earth.

5. A process as set forth in claim 3 wherein said terpene is a cyclic terpene.

GASTAO ETZEL.